US012810594B2

(12) United States Patent
Hakami et al.

(10) Patent No.: US 12,810,594 B2
(45) Date of Patent: Nov. 24, 2026

(54) METHOD AND SYSTEM FOR IDENTIFYING VISUAL POLLUTION

(71) Applicant: ELM Company, Riyadh (SA)

(72) Inventors: Mohammed Yahya Hakami, Riyadh (SA); Thariq Khalid Kadavil, Riyadh (SA); Riad Souissi, Riyadh (SA)

(73) Assignee: ELM Company, Riyadh (SA)

( * ) Notice: Subject to any disclaimer, the term of this patent is extended or adjusted under 35 U.S.C. 154(b) by 201 days.

(21) Appl. No.: 18/749,116

(22) Filed: Jun. 20, 2024

(65) Prior Publication Data

US 2024/0428569 A1 Dec. 26, 2024

Related U.S. Application Data

(60) Provisional application No. 63/509,746, filed on Jun. 22, 2023.

(51) Int. Cl.

| | |
|---|---|
| ***G06V 10/774*** | (2022.01) |
| ***G06T 7/50*** | (2017.01) |
| ***G06T 7/60*** | (2017.01) |
| ***G06V 10/26*** | (2022.01) |
| ***G06V 10/776*** | (2022.01) |
| ***G06V 10/778*** | (2022.01) |
| ***G06V 20/56*** | (2022.01) |

(52) U.S. Cl.

CPC .............. *G06V 10/774* (2022.01); *G06T 7/50* (2017.01); *G06T 7/60* (2013.01); *G06V 10/26* (2022.01); *G06V 10/776* (2022.01); *G06V 10/7792* (2022.01); *G06V 20/56* (2022.01); *G06T 2207/10016* (2013.01); *G06T 2207/20081* (2013.01); *G06T 2207/20084* (2013.01)

(58) Field of Classification Search

CPC .... G06V 10/774; G06V 10/26; G06V 10/776; G06V 10/7792; G06V 20/56; G06V 10/764; G06V 10/82; G06T 7/50; G06T 7/60; G06T 2207/10016; G06T 2207/20081; G06T 2207/20084

See application file for complete search history.

(56) References Cited

U.S. PATENT DOCUMENTS

| | | | | |
|---|---|---|---|---|
| 11,776,292 | B2 * | 10/2023 | Huang | G06N 3/09 382/181 |
| 2018/0268292 | A1 * | 9/2018 | Choi | G06F 18/21 |
| 2021/0125076 | A1 * | 4/2021 | Zhang | G06N 3/045 |
| 2024/0005648 | A1 * | 1/2024 | Bondugula | G06N 3/045 |

* cited by examiner

*Primary Examiner* — Bobbak Safaipour
*Assistant Examiner* — Samuel D Baynes
(74) *Attorney, Agent, or Firm* — NKL Law; Allen Xue

(57) ABSTRACT

Provided are computer-implemented technologies of identifying visual pollutions. The technologies include training expert models based on an enhanced knowledge distillation paradigm in which a student model learns from a number of teacher models via a customized training approached specifically for achieving efficiency and effectiveness, quality-controlling and fine-tuning the trained expert model in a production environment via continuous training under newly incorporated training data and object classifications and factoring feedbacks of the detection result of the model on new training data and/or new object classifications, deploying and applying the expert model in detecting, tracking, logging, counting, and reporting a set of visual pollution elements in an environment where visual pollutions are to be detected.

20 Claims, 10 Drawing Sheets

700

METHOD AND SYSTEM FOR IDENTIFYING VISUAL POLLUTION

RELATED APPLICATIONS

This application claims the benefit of priority under 35 U.S.C. § 119 to U.S. Provisional Application No. 63/509,746, filed on Jun. 22, 2023, the entire contents of which are incorporated herein by reference.

BACKGROUND

1. Field of Technology

The present invention relates to the field of technology-enabled objects detection/identification. Specifically, the present method and/or system relates to technologically identifying visual pollution (VP), which refers to the visible deterioration and negative aesthetic quality of the natural and human-made landscapes around human habitat such as cities or towns.

2. Description of Related Art

Visual pollution, or visual distortion, is unpleasant and undesirable. Smart cities have to get rid of the visual distortions in order to be self-sustainable and keep their population and habitat healthier and aesthetic. The first step towards this goal is the identification/detection of the visual pollution elements. The challenge of the detection of VP, however, is the cost incurred by the detection, labor cost in particular.

There are multiple ways in which visual pollution can be detected. One such way could be to send human inspectors throughout the cities/towns. Another way is to install CCTV cameras in specific places where the probability of visual pollution is high. The former method is heavily dependent on human labor, and thus it time, labor, and other resource consuming. The latter method has the limitation that it is limited to where the CCTV is installed, and the areas out of the reach of the installed CCTV are un-examinable to the installed CCTV. Therefore, there is a need to address the shortcomings of the aforementioned two methods of VP detection.

One method for automated detecting VPs is using a trained machine learning model to detect VPs from captured images or video footages of an area to be examined. The trained machine learning model, in order to be effective, has to be able to detect all VPs from the captured images of video footages, and have minimal false positives (i.e., a non-VP being mistaken as a VP). However, most machine learning models for detecting visual objects are cumbersome and incapable to function in a real-time fashion. To solve the problem, knowledge distillation plays a useful role in helping overcome these challenges encountered by large-scale machine learning and deep learning models (such as, cumbersome models, unsatisfactory throughput in handling real-world data) by capturing and then distilling the knowledge in a sophisticated machine learning model or an ensemble of trained models into a smaller single model that is much easier to deploy without significant loss in performance. The benefit of having a smaller single model is particularly pronounced in applying the machine learning model in a real-time application.

As an example of knowledge distillation, the US patent application US200401929 is directed to methods and systems for knowledge distillation. Implementations of the methods/systems include executing the following actions using one or more computing devices: obtaining an initial training dataset including multiple training examples; determining sets of outputs by performing inference on the training examples with a group of pre-trained machine-learned models that have been trained to perform a respective task based on a respective pre-trained model training dataset; evaluating a performance of each pretrained machine-learned model based at least in part on the set of outputs generated by the pre-trained machine-learned model; determining for the set of outputs generated by each pre-trained machine-learned model, whether to include one or more outputs of the set of outputs in a distillation training dataset based at least in part on the respective performance of such pre-trained machine-learned model; and training a distilled machine-learned model using the distillation training dataset.

As another example of knowledge distillation, the U.S. Pat. No. 1,636,337 is directed to systems and methods for knowledge distillation providing supervised training of a student network with a teacher network, including inputting a batch to the teacher network, inputting the batch to the student network, generating a teacher activation map at a layer of the teacher network, generating a student activation map at a layer of the student network corresponding to the layer of the teacher network, generating a pairwise teacher similarity matrix based on the teacher activation map, generating a pairwise student similarity matrix based on the student activation map, and minimizing a knowledge distillation loss defined as a difference between the pairwise teacher similarity matrix and the pairwise student similarity matrix.

At the best, the prior art methods and/or systems have limited capability in one way or the other, and as the result, they lag behind in successful rate in training an efficient and effective machine learning model applicable for detecting a visual object in a real-time fashion. What is needed is to customize the knowledge distillation paradigm to the application of distilling specific knowledge of visual objects of interest among image/video data, to produce an efficient and lean model that is capable to real-timely detect visual objects of interest. What is also needed is to have such a trained model that can be self-healing via continuous model improvement based on batch training over newly acquire image/video data.

SUMMARY OF THE DESCRIPTION

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The purpose of the present disclosure is to resolve the aforementioned problems and/or limitations of the conventional technique, that is, to provide a technology-enabled visual pollution detection capability for accurately and efficiently detecting, identifying, counting, and tracking visual pollutions from one or more video footages of street scenes.

Provided is a computer-implemented method for real-timely detecting visual pollution (VP), comprising: training a plurality of expert models based on a plurality of test sets of images or video footages and a plurality of pre-determined objects to detect the plurality of pre-determined objects among the plurality of test sets of images or video footage, and to produce a VP model, wherein the training is a procedure that automates machine learning workflows by processing and integrating the plurality of test sets of images or video footages into the VP model in terms of detecting the plurality of pre-determined objects from the plurality of test sets of images or video footages, and the training comprises designating one of the plurality of expert models as a student model, designating the rest of the plurality of expert models as teacher models, conducting a plurality of knowledge distillation iterations on the plurality of test sets of images or video footages and the plurality of pre-determined objects, outputting the student model as the VP model; deploying the VP model into a production environment to receive a production set of images or video footage, running the VP model through the production set of images or video footages, quality-assuring the VP model to produce feedback including a set of false-positives and false-negatives, re-training the VP model based on a plurality of test sets of images or video footages and a plurality of pre-determined objects by factoring the feedback, and re-deploying the VP model into the production environment, wherein the production environment is an edge-device mounted on the moving vehicle, an on-premise computing system communicatively connected to the moving vehicle, or a remote cloud system communicatively connected to the moving vehicle; capturing and storing a set of images or video footages by using a photographing device mounted on the moving vehicle; detecting, by using the VP model, a set of visual pollution elements from the set of images or video footages; estimating, for each element of the set of visual pollution elements, a size of the visual pollution element based on an unsupervised camera depth estimation model; calculating, for each visual pollution element of the set of visual pollution elements, an absolute position of the visual pollution element based on a geographical location and a plurality of movement properties of the moving vehicle, wherein the plurality of movement properties of the moving vehicle include movement speed, movement direction, and movement acceleration rate of the moving vehicle; tracking, logging, and counting the set of visual pollution elements along with their respective estimated size and absolute position; and reporting, and displaying the set of visual pollution elements along with their respective estimated size and absolute position.

In one embodiment of the provided method, integrating a newly acquired set of images or video footages into the plurality of sets of images or video footages, and re-training the plurality of expert models to produce the VP model based on the plurality of sets of images or video footages, and the plurality of pre-determined objects.

In another embodiment of the provided method, integrating a newly acquired set of pre-determined objects into the plurality of pre-determined objects, and re-training the plurality of expert models to produce the VP model based on the plurality of sets of images or video footages, and the plurality of pre-determined objects.

In another embodiment of the provided method, integrating a newly acquired set of images or video footages into the plurality of sets of images or video footages, integrating a newly acquired set of pre-determined objects into the plurality of pre-determined objects, and re-training the plurality of expert models to produce the VP model based on the plurality of sets of images or video footages, and the plurality of pre-determined objects.

In another embodiment of the provided method, wherein the plurality of knowledge distillation iterations on the plurality of sets of images or video footages is free from human intervention and allows self-healing and continuous learning improvement with batch training over a set of newly acquired images, the number of the plurality of knowledge distillation iterations either is pre-determined or the plurality knowledge distillation iterations go on until a pre-determined training threshold is reached, and each iteration of the plurality of knowledge distillation iterations comprises: loading and training the teacher models against the plurality of sets of images or video footages and, in the case of the set newly acquired images being available, the set of newly acquired images, extracting, for each teacher model, an output, a model confidence, classification lose, and localization lose over a set of augmented images from the each of the teacher models, wherein the set of augmented images are the images being augmented, with or without a label, among the plurality of sets of images or video footages, and, in the case of the set newly acquired images being available, the set of newly acquired images; loading and training the student model against the set of augmented images, extracting an output, a classification lose, and a localization lose, from the student model over the set of augmented images; comparing, for each of the teacher models, the output, the classification lose, and the localization lose extracted from the student model, with the output, classification lose, and localization lose extracted from the teacher model; passing, for each of the teacher models, the classification lose and localization lose extracted from the student model alone to a model optimizer in the case of that the student model has better performance than the teacher model; passing, for each of the teacher models, the classification lose and localization lose extracted from the student model along with the classification lose and localization lose extracted from the teacher model to a model optimizer in the case of that the teacher model has better performance than the student model; updating, for each of the teacher models, by the model optimizer, a set of parameters of the student model, allowing the student to learn from the teacher model; updating, for each of the teacher models, via an Exponential Moving Average approach, the teacher model's output layer to the student model, starting with a small weightage to allow the student model mimicking the teacher model in a small increment.

In another embodiment of the provided method, wherein the calculating, for each element of the first set of visual pollution elements, an absolute position based on the geographical location and the plurality of movement properties of the moving vehicle, comprises: estimating, for each element of the set of visual pollution elements, a relative position of the element in relation to the photographing device by using a global positioning system (GPS), an Inertial Measurement Unit (IMU), and a depth estimation; and calculating, for each element of the first set of visual pollution elements, the absolute position of the element by augmenting the relative position of the element with a position of the photographing device at the time the set of captured still images were captured.

In another embodiment of the provided method, wherein the detecting, by using the VP model, a set of visual pollution elements from the set of images or video footages further comprising using a hash table and a memory to uniquely detect the set of visual pollution elements across multiple frames of the set of images or video footages.

In a variated embodiment of the provided method stated in paragraph [0013], wherein before re-training the plurality of expert models to produce the VP model based on the plurality of sets of images or video footages, relabelling images, or video footages in the plurality of sets of images or video footages when the newly acquired set of pre-determined objects is integrated into the plurality of pre-determined objects.

In another embodiment of the provided method, wherein the training a plurality of expert models based on a plurality of test sets of images or video footages and a plurality of pre-determined objects to recognize the plurality of pre-determined objects among the data in the plurality of sets of test images or video footage comprising applying pixel level segmentation in detecting a first set of objects in the plurality of pre-determined objects, and applying bounding boxes technique in detecting a second set of objects in the plurality of pre-determined objects.

In another embodiment of the provided method, wherein the tracking, logging, and counting the set of visual pollution elements along with their respective estimated size and absolute position comprising assigning an ID for each VP element of the set of visual pollution elements, and using a video object segmentation technique, a short-term memory and a long-term memory to keep track of the each VP element across all the frames of the set of images or video footages.

Provided is a system, comprising: a computing device, one or more photographing devices, a production environment, wherein the production environment is an edge-device mounted on a moving vehicle, an on-premise computing system communicatively connected to the moving vehicle, or a remote cloud system communicatively connected to the moving vehicle, wherein the computing device comprises a GPU, a processor, one or more computer-readable memories and one or more computer-readable, tangible storage devices, one or more input devices, one or more output devices, and one or more communication devices, and wherein the one or more photographing devices are connected to the computing device and are mounted in the moving vehicle for feeding one or more captured video streams of street scenes to the computing device's video buffer, wherein the computing device to perform operations comprising: training a plurality of expert models based on a plurality of test sets of images or video footages and a plurality of pre-determined objects to detect the plurality of pre-determined objects among the plurality of test sets of images or video footage, and to produce a VP model, wherein the training is a procedure that automates machine learning workflows by processing and integrating the plurality of test sets of images or video footages into the VP model in terms of detecting the plurality of pre-determined objects from the plurality of test sets of images or video footages, and the training comprises designating one of the plurality of expert models as a student model, designating the rest of the plurality of expert models as teacher models, conducting a plurality of knowledge distillation iterations on the plurality of test sets of images or video footages and the plurality of pre-determined objects, outputting the student model as the VP model; deploying the VP model into a production environment, to receive a production set of images or video footage, running the VP model through the production set of images or video footages, quality-assuring the VP model to produce feedback including a set of false-positives and false-negatives, re-training the VP model based on a plurality of test sets of images or video footages and a plurality of pre-determined objects by factoring the feedback, and re-deploying the VP model into the production environment; capturing and storing a set of images or video footages by using the one or more photographing devices; detecting, by using the VP model, a set of visual pollution elements from the set of images or video footages; estimating, for each element of the set of visual pollution elements, a size of the visual pollution element based on an unsupervised camera depth estimation model; calculating, for each visual pollution element of the set of visual pollution elements, an absolute position of the visual pollution element based on a geographical location and a plurality of movement properties of the moving vehicle, wherein the plurality of movement properties of the moving vehicle include movement speed, movement direction, and movement acceleration rate of the moving vehicle; tracking, logging, and counting the set of visual pollution elements along with their respective estimated size and absolute position; and reporting, and displaying the set of visual pollution elements along with their respective estimated size and absolute position.

In an embodiment of the provided system, wherein the computing device to perform operations further comprising integrating a newly acquired set of images or video footages into the plurality of sets of images or video footages, and re-training the plurality of expert models to produce the VP model based on the plurality of sets of images or video footages, and the plurality of pre-determined objects.

In another embodiment of the provided system, wherein the computing device to perform operations further comprising integrating a newly acquired set of pre-determined objects into the plurality of pre-determined objects, and re-training the plurality of expert models to produce the VP model based on the plurality of sets of images or video footages, and the plurality of pre-determined objects.

In another embodiment of the provided system, wherein the computing device to perform operations further comprising integrating a newly acquired set of images or video footages into the plurality of sets of images or video footages, integrating a newly acquired set of pre-determined objects into the plurality of pre-determined objects, and re-training the plurality of expert models to produce the VP model based on the plurality of sets of images or video footages, and the plurality of pre-determined objects.

In another embodiment of the provided system, wherein the plurality of knowledge distillation iterations on the plurality of sets of images or video footages is free from human intervention and allows self-healing and continuous learning improvement with batch training over a set of newly acquired images, the number of the plurality of knowledge distillation iterations either is pre-determined or the plurality knowledge distillation iterations go on until a pre-determined training threshold is reached, and each iteration of the plurality of knowledge distillation iterations comprises: loading and training the teacher models against the plurality of sets of images or video footages and, in the case of the set newly acquired images being available, the set of newly acquired images, extracting, for each teacher model, an output, a model confidence, classification lose, and localization lose over a set of augmented images from the each of the teacher models, wherein the set of augmented images are the images being augmented, with or without a label, among the plurality of sets of images or video footages, and, in the case of the set newly acquired images being available, the set of newly acquired images; loading and training the student model against the set of augmented images, extracting an output, a classification lose, and a localization lose, from the student model over the set of augmented images; comparing, for each of the teacher models, the output, the classification lose, and the localization lose extracted from the student model, with the output, classification lose, and localization lose extracted from the teacher model; passing, for each of the teacher models, the classification lose and localization lose extracted from the student model alone to a model optimizer in the case of that the student model has better performance than the teacher model; passing, for each of the teacher models, the classification lose and localization lose extracted from the student model along with the classification lose and localization lose extracted from the teacher model to a model optimizer in the case of that the teacher model has better performance than the student model; updating, for each of the teacher models, by the model optimizer, a set of parameters of the student model, allowing the student to learn from the teacher model; updating, for each of the teacher models, via an Exponential Moving Average approach, the teacher model's output layer to the student model, starting with a small weightage to allow the student model mimicking the teacher model in a small increment.

In another embodiment of the provided system, wherein the calculating, for each element of the first set of visual pollution elements, an absolute position based on the geographical location and the plurality of movement properties of the moving vehicle, comprises: estimating, for each element of the set of visual pollution elements, a relative position of the element in relation to the photographing device by using a global positioning system (GPS), an Inertial Measurement Unit (IMU), and a depth estimation; and calculating, for each element of the first set of visual pollution elements, the absolute position of the element by augmenting the relative position of the element with a position of the photographing device at the time the set of captured still images were captured.

In another embodiment of the provided system, wherein the detecting, by using the VP model, a set of visual pollution elements from the set of images or video footages further comprising using a hash table and a memory to uniquely detect the set of visual pollution elements across multiple frames of the set of images or video footages.

In a varied embodiment of the provided system stated in paragraph [0023], wherein before re-training the plurality of expert models to produce the VP model based on the plurality of sets of images or video footages, relabelling images, or video footages in the plurality of sets of images or video footages when the newly acquired set of pre-determined objects is integrated into the plurality of pre-determined objects.

In another embodiment of the provided system, wherein the training a plurality of expert models based on a plurality of test sets of images or video footages and a plurality of pre-determined objects to recognize the plurality of pre-determined objects among the data in the plurality of sets of test images or video footage comprising applying pixel level segmentation in detecting a first set of objects in the plurality of pre-determined objects, and applying bounding boxes technique in detecting a second set of objects in the plurality of pre-determined objects.

In another embodiment of the provided system, wherein the tracking, logging, and counting the set of visual pollution elements along with their respective estimated size and absolute position comprising assigning an ID for each VP element of the set of visual pollution elements, and using a video object segmentation technique, a short-term memory and a long-term memory to keep track of the each VP element across all the frames of the set of images or video footages.

Other features and aspects will be apparent from the following detailed description, the drawings, and the claims.

BRIEF DESCRIPTION OF THE DRAWINGS

The present invention is illustrated by way of example and not limited in the figures of the accompanying drawings in which like references indicate similar elements.

DETAILED DESCRIPTION

Various embodiments and aspects of the inventions will be described with reference to details discussed below, and the accompanying drawings will illustrate some embodiments. The following description and drawings are illustrative of the invention and are not to be construed as limiting the scope of the invention. Numerous specific details are described to provide an overall understanding of the present invention to one of ordinary skill in the art.

Reference in the specification to "one embodiment" or "an embodiment" or "another embodiment" means that a particular feature, structure, or characteristic described in conjunction with the embodiment can be included in at least one embodiment of the invention but need not be in all embodiments. The appearances of the phrase "in one embodiment" in various places in the specification do not necessarily all refer to the same embodiment.

Embodiments use a computer system for training a VP model, receiving, storing and analyzing video footages of street scenes to detect VP elements therein by using the VP model. The system, in particular, employs artificial intelligence techniques to train the VP model in a customized way to make the model lightweight and yet effective in handling real-time video footages.

Figure 1:
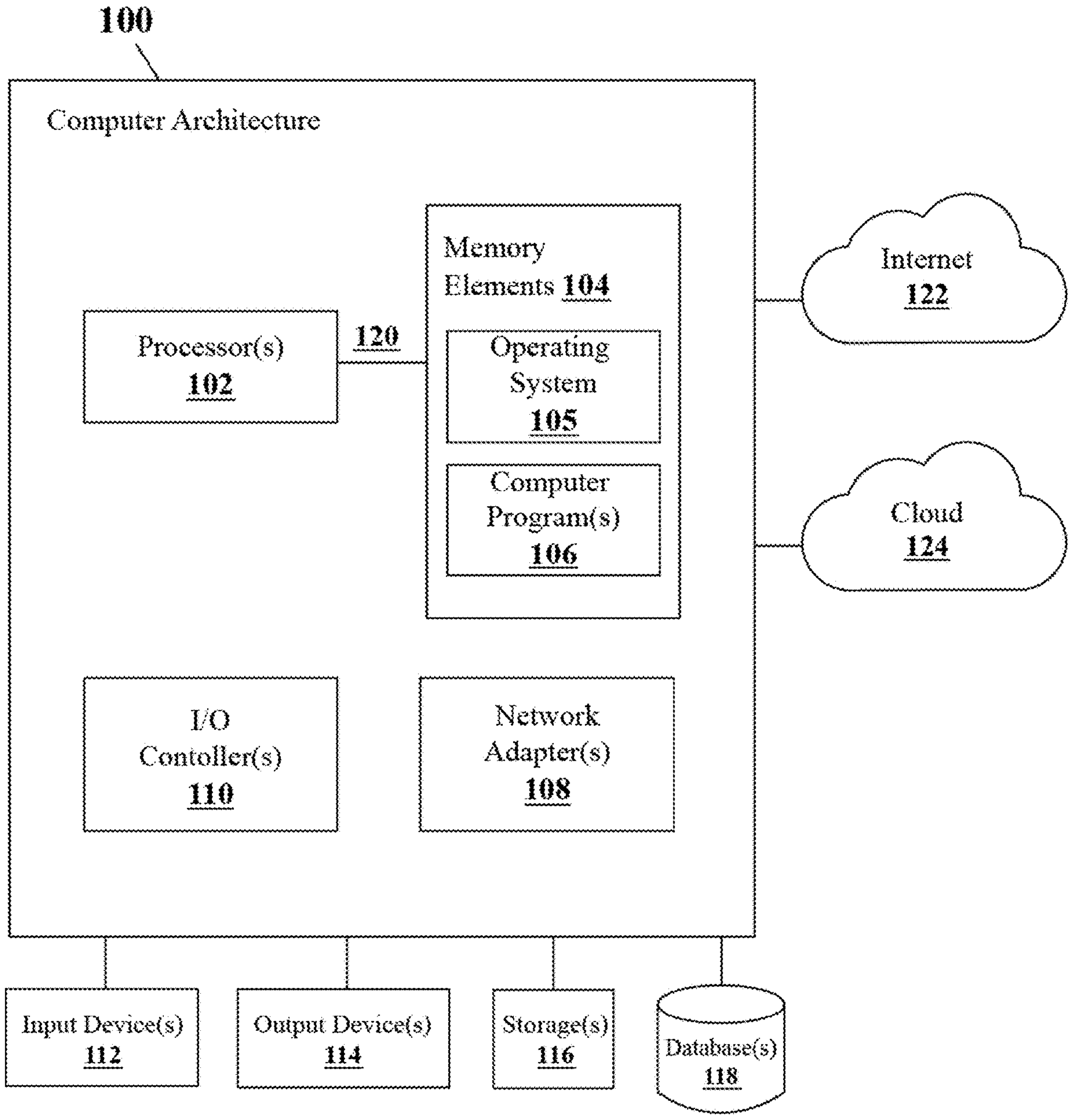
FIG. 1 illustrates, in a schematic block diagram, a computing environment being used in accordance with all embodiments. The environment, in all embodiments, may include artificial intelligence (AI) or machine learning (ML) features (not shown, but are implicitly represented as Computer Programs).

FIG. 1 illustrates a computer architecture 100 that may be used in accordance with certain embodiments. In certain embodiments, the raw sports data collection, storage, and process use computer architecture 100. The computer architecture 100 is suitable for storing and/or executing computer readable program instructions and includes at least one processor 102 coupled directly or indirectly to memory elements 104 through a system bus 120. The memory elements 104 may include one or more local memories employed during actual execution of the program code, bulk storage, and cache memories which provide temporary storage of at least some program code in order to reduce the number of times code must be retrieved from bulk storage during execution. The memory elements 104 include an operating system 105 and one or more computer programs 106, and the operating system 105, as understood by one skilled in the computer art, controls the operation of the entire computer architecture 100 and the architecture 100's interaction with components coupled therewith such as the shown components (input device(s) 112, output device(s) 114, storage(s) 116, databases 118, internet 122, and cloud 124) and unshown components that are understood by one skilled in the art, and the operating system 105 may be switched and changed as fit.

Input/Output (I/O) devices 112, 114 (including but not limited to keyboards, displays, pointing devices, transmitting device, mobile phone, edge device, verbal device such as a microphone driven by voice recognition software or other known equivalent devices, etc.) may be coupled to the system either directly or through intervening I/O controllers 110. More pertinent to the embodiments of disclosure are photographing devices as one genre of input device. A photographing device can be a camera, a mobile phone that is equipped with a camera, an edge device that is equipped with a camera, or any other device that can capture one or more images/videos of an object (or a view) via various means (such as optical means or radio-wave based means), store the captured images/videos in some local storage (such as a memory, a flash disk, or the like), and to transmit the captured images/videos, as input data, to either a more permanent storage (such as a database 118, a storage 116) or the at least one processor 102, depending on the demand of to where the captured images/videos are to be transmitted.

Input Devices 112 receive input data (raw and/or processed), and instructions from a user or other source. Input data includes, inter alia, (i) captured images of street scenes, (ii) captured videos of street scenes, and/or (iii) a set of pre-defined objects that are essentially all possible real-world objects common in ordinary street scenes.

Network adapters 108 may also be coupled to the system to enable the data processing system to become coupled to other data processing systems or remote printers or storage devices through intervening private or public networks. Modems, cable modem and Ethernet cards are just a few of the currently available types of network adapters 108. Network adapters 108 may also be communicatively coupled to internet 122 and/or cloud 124 to access remote computer resources such as on-premise computing systems (not shown in FIG. 1).

The computer architecture 100 may be coupled to storage 116 (e.g., any type of storage device; a non-volatile storage area, such as magnetic disk drives, optical disk drives, a tape drive, etc.). The storage 116 may comprise an internal storage device or an attached or network accessible storage. Computer programs 106 in storage 116 may be loaded into the memory elements 104 and executed by a processor 102 in a manner known in the art.

Computer programs 106 may include AI programs or ML programs, and the computer programs 106 may partially reside in the memory elements 104, and partially reside in storage 116 and partially reside in cloud 124 or in an on-remise computing system via internet 122.

The computer architecture 100 may include fewer components than illustrated, additional components not illustrated herein, or some combination of the components illustrated and additional components. The computer architecture 100 may comprise any computing device known in the art, such as a mainframe, server, personal computer, workstation, laptop, handheld computer, telephony device, network appliance, virtualization device, storage controller, virtual machine, smartphone, tablet, etc.

Input device(s) 112 transmits input data to processor(s) 102 via memory elements 104 under the control of operating system 105 and computer program(s) 106. The processor(s) 102 may be central processing units (CPUs) and/or any other types of processing device known in the art. In certain embodiments, the processing devices 102 are capable of receiving and processing input data from multiple users or sources, thus the processing devices 102 have multiple cores. In addition, certain embodiments involve the use of videos (i.e., graphics intensive information) or digitized information (i.e., digitized graphics), these embodiments therefore employ graphic processing units (GPUs) as the processor(s) 102 in lieu of or in addition to CPUs.

Certain embodiments also comprise at least one database 118 for storing desired data. Some raw input data are converted into digitized data format before being stored in the database 118 or being used to create the desired output data. It's worth noting that storage(s) 116, in addition to being used to store computer program(s) 106, are also sometimes used to store input data, raw or processed, and to store intermediate data. The permanent storage of input data and intermediate data is primarily database(s) 118. It is also noted that the database(s) 118 may reside in close proximity to the computer architecture 100, or remotely in the cloud 124, and the database(s) 118 may be in various forms or database architectures.

Computer Architecture 100 generically represents both an edge-device mounted on a moving vehicle, a computer server, or an ensemble of computer servers, a mobile computing device (such as a mobile phone), or a communicatively coupled and distributed computing resources that collectively have the elements and structures of the Computer Architectures 100.

Because certain embodiments need a storage for storing large volumes of photo image/video data, more than one database likely is used.

The provided method and/or system involves scanning of street scenes of a city/town via a photographing device such as a mobile or edge-based device (an edge-based device captures, stores, and pre-processes of images/video footages of an object or scene).

Figure 2:
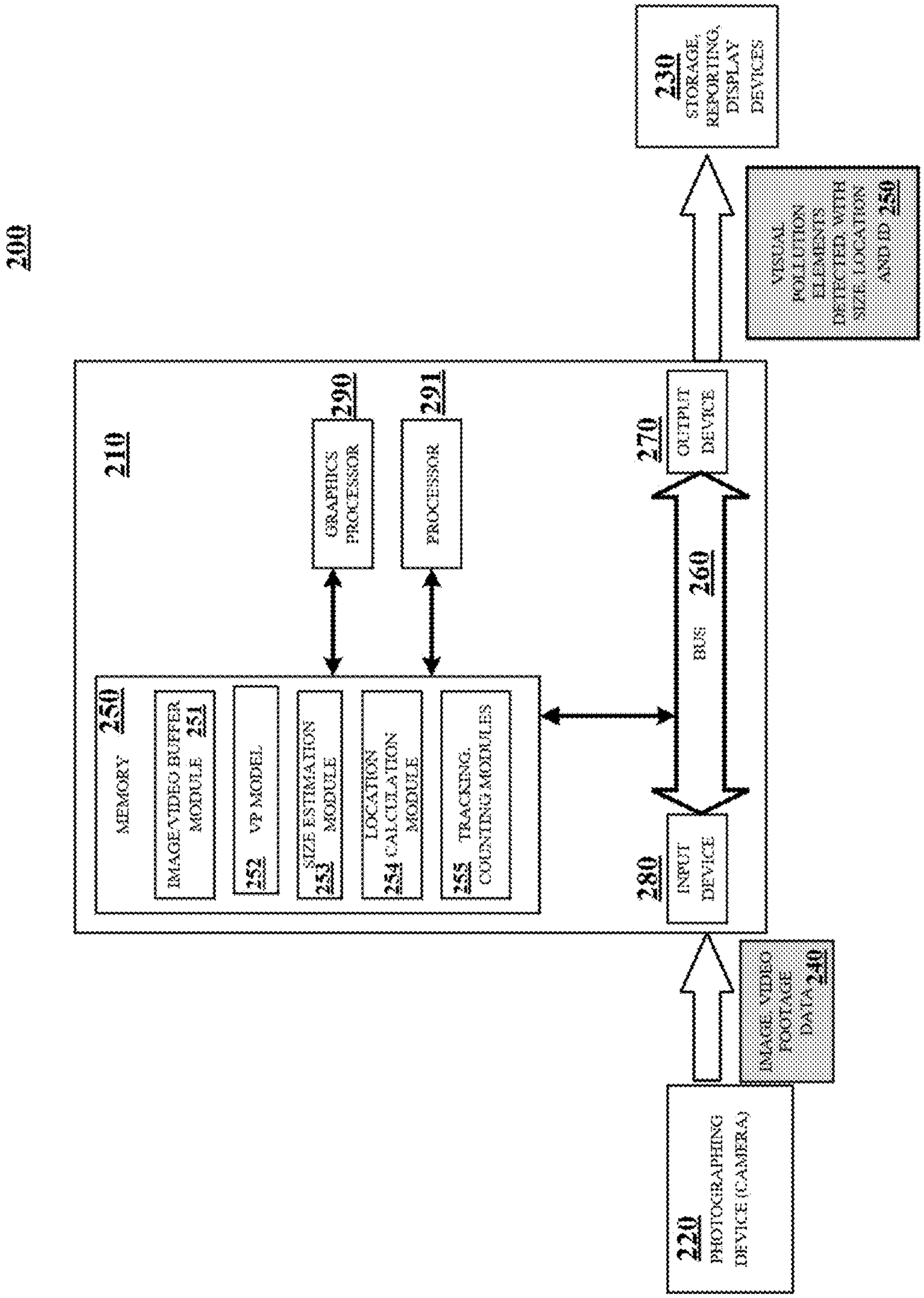
FIG. 2 schematically illustrates a computing system that facilitates real-timely detecting visual pollution elements from stream of input images or video footages.

FIG. 2 shows a computing system 200 that is composed with a computing device 210 in collaboration with, and communicatively or directly coupled with, a photographing device 220 and storage, reporting, and display devices 230, to facilitate real-timely detecting visual pollution elements (along with their location, size and identification (ID)) 250 from a continuous stream of image or video footage data 240 captured and supplied from one or more photographing devices (cameras, etc.) 220. The input device 280 of the computing device 210 takes in the image/video stream data 240 via various commonly-known input channels, and passes on the input data to the bus 260, which in turn moves the input data to the memory 250. Memory 250 is composed with memory storages which have space for input/output data storage, temporary storage for interacting with GPUs/CPUs, and have installed with, in addition to necessary supporting software modules such as operating system 105, image/video buffer module 151, a Visual Pollution (VP) model 252, a size estimation module, 253, a location calculation module 254, and tracking and counting modules 255. The image/video buffer module 251 stores input image/video footage data supplied from the bus 260, and from buffer module 251, the VP model 252 retrieves image/video data, and in the case of the retrieved data being video footages, the model orderly gets image frames from the footages, and then conducts detection on the frames. Once a VP element is detected, it is analyzed to find out whether it is a new VP element that has not appear in the previous frames/images. This analysis invokes using some short-term memory and long-term memory specifically reserved in the Memory 250, for the purpose of all the detected VP element are uniquely identified and tracked, and to ensure no VP element is redundantly identified and tracked.

Since the detection of VP elements are computationally intensive, the work of the VP model may be carried on in the graphics processor(s) (GPU) 290 if the GPUs are available in the computing device 210. In the case of that GPU(s) are not available in 210, the general processor(s) (CPU(s)) 291 carries the computational work of VP element detection. In the case of GPU(s) are available in 210, GPU(s) may collaborate with CPU(s) to carry on the detection of VP elements.

Once a VP element is detected, it is then identified by the tracking and counting modules 255, to avoid redundant identification. The tracking, identifying and counting of VP elements resort using a short-term memory and a long-term memory, and video panoptic segmentation technique (which uses the short-term memory and the long-term memory to extend panoptic segmentations by incorporating temporal dimension so that the pixels belonging to the same object instance (VP element) is assigned the same instance ID throughout the video sequence) to ensure each VP element is only assigned with one ID. Eventually, each detected VP element is assigned an ID, and each detected VP element that is previously assigned with an ID will not be re-assigned to a different ID. The tracking and counting of a detected and identified VP element is to keep a countable trace of the element across different images or frames of a video footage.

For each detected and identified VP element, its size is estimated by the size estimation module 253. The module uses an unsupervised and camera-independent camera depth estimation technique. Since the segmentation of the VP element is one of the main factors with which the dimension thereof can be found, a neural network is pre-trained with segmentation masks which are an output during the moving vehicle deployment. The depth to the element can be derived, by the neuro network, by using mono-depth, which is the distance to the element along with the relative orientation/position of the element. The speed of the moving vehicle will give information about the distance covered simultaneously while the element is being tracked. The element's size can be thus estimated from two axes (X and Y) with the monocular view. This will give the occupancy of object with respect to the ground.

For each detected and identified VP element, its absolute location is calculated by the location calculation module 254. The module first estimates the VP element's relative position to photographing device by using the GPS (Global Positioning System), IMU (Inertia Measurement Unit), and DEM (depth estimation module) (Note, the GPS, IMU, and DEM are not shown in FIG. 2). Specifically, by using the IMU, GPS, and the speed estimation (via DEM), triangulation of the VP element is achieved while the moving vehicle is moving until the last frame is observed with the VP. Now these set of GPS coordinates and the IMU values are taken along with the speed of the moving vehicle and the depth estimation using monocular vision. Based on the depth value and the compass data of the IMU, along with the acceleration, the 2D VP element can be located in worldview and the distance to the VP element from the moving vehicle can be fairly accurately calculated.

The tasks by modules 253, 254, and 255 can be carried on in GPU(s) 290 or CPU(s) 291 or in both types of processors in collaboration.

Once a detected VP element is detected, identified, traced, and having its size and location calculated, its ID, location and size are tagged with the element, and the tagged element (which is a data encapsulates the VP element, its size, location, and ID 250) is then augmented back to the video frame where it occurs. This augmentation is then written back to the video stream. Bus 260 then pipes out the augmented video stream to the output device, which is any technologically conceivable output device, and the output device piped out the augmented VP elements along with the image or video footage to the storage, reporting, displace devices 230.

Figure 9:
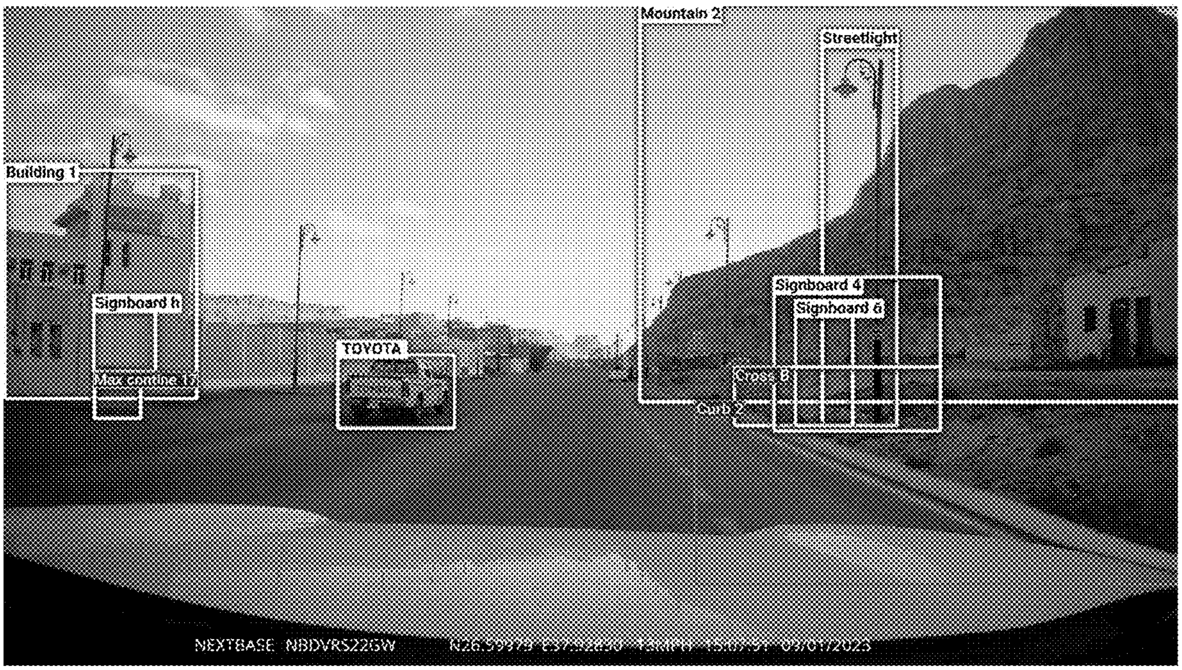
FIGS. 9-11 show examples of identified VP elements along with their IDs, size, and location.
Figure 10:
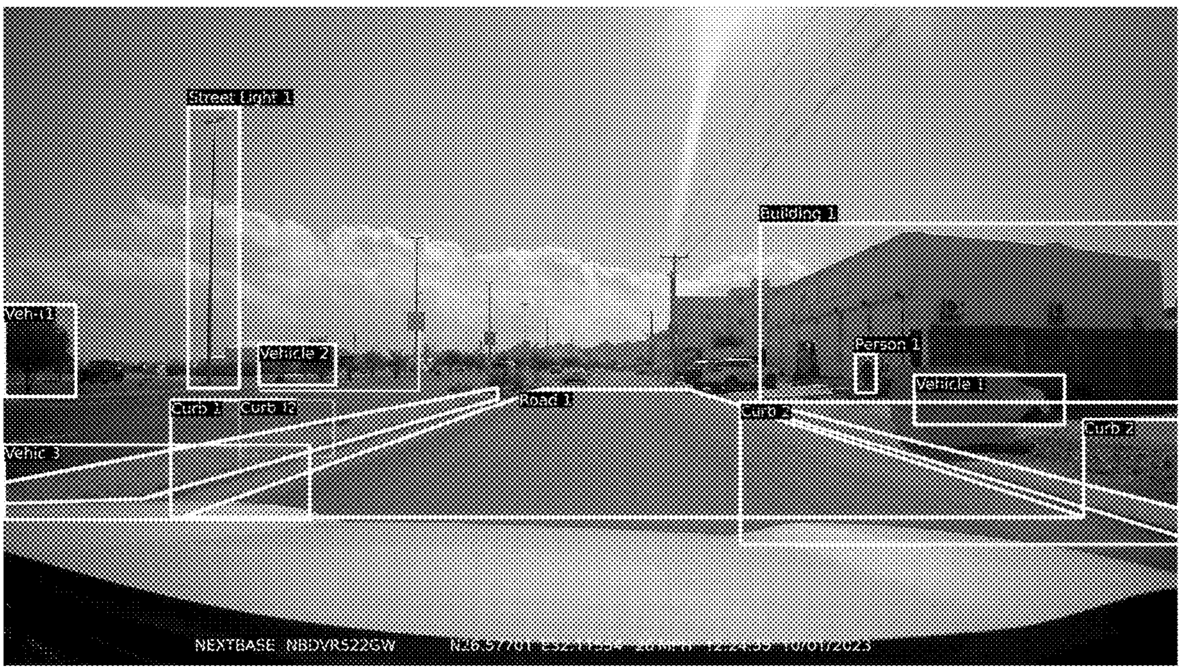
Figure 11:
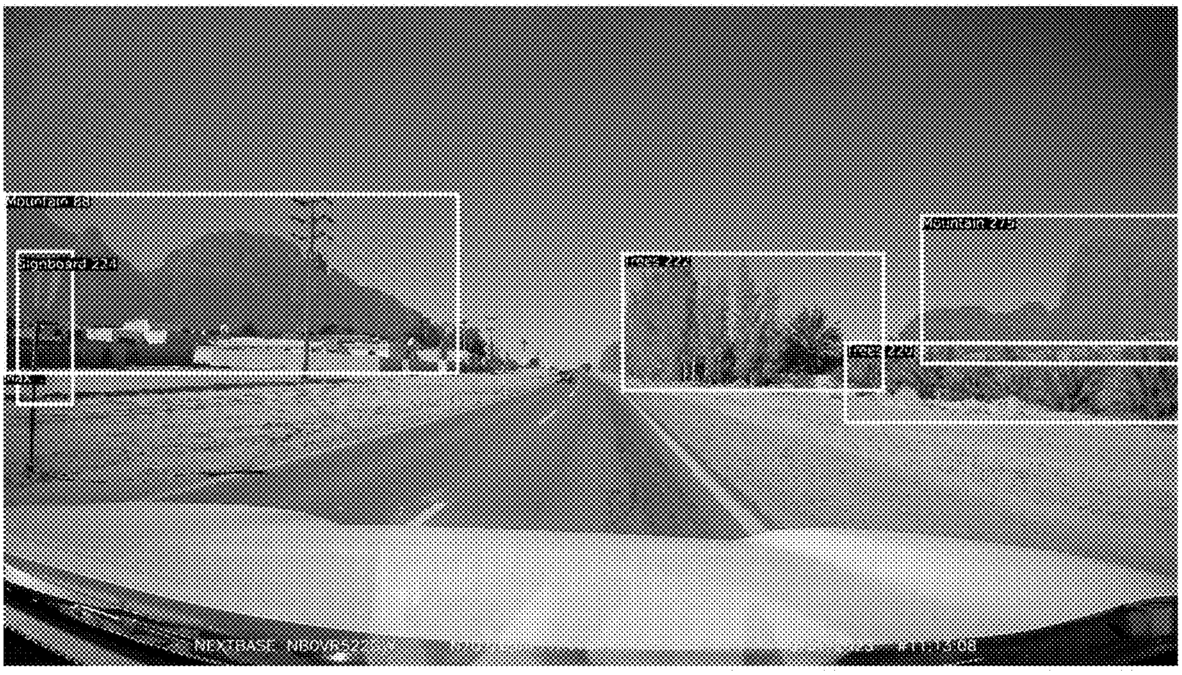

Devices 230 store the augmented data in a storage device, reporting the VP elements, along with its ID, location and size, in any form of reporting (print, fax, email, publish to a web portal, etc.), and displaying the VP elements, along with its ID, location and size in a screen for end users to review. FIGS. 9-11 show examples of such displaying, in which identified VP elements are shown with their IDs, size, and location.

In some embodiments, the computing device 210 can be an edge-device mountable and/or mounted on a moving vehicle (also named as onboard edge device), in which case, the photographing device 220, in some embodiments, is mounted on the same moving vehicle, and some part of the storage/reporting/display devices 230 is also mounted on the same moving vehicle (for example, the displaying part is mounted on the moving vehicle, while the storage part and the reporting part of 230 may or may not be mounted on the moving vehicle).

In some embodiments, the computing device 210 can be an on-premise computer server communicatively coupled with on a moving vehicle, on which, the photographing device 220, is mounted. In this setup, the photographing device streams the image/video data 240, via the vehicle-based communication network, to the remote computing device 210, and the 210, after has done its detection and augmentation tasks, outputs the VP element related data 250 to the storage/reporting/displaying devices 230. In the case where the displaying part of 230 is mounted on the moving vehicle, the output data 250 is streaming back to the displaying part of 230 via the vehicle-based network.

In some embodiments, the computing device 210 can be a cloud-based resource communicatively coupled with on a moving vehicle, on which, the photographing device 220, is mounted. In this setup, the photographing device streams the image/video data 240, via the vehicle-based communication network, to the cloud-based resource 210, and the 210, after has done its detection and augmentation tasks, outputs the VP element related data 250 to the storage/reporting/displaying devices 230. In the case where the displaying part of 230 is mounted on the moving vehicle, the output data 250 is streaming back to the displaying part of 230 via the vehicle-based network.

As described above, an onboard edge device stores all pictures/video-footages of the street scenes along the road on which a moving vehicle (inspection vehicle) travels. The onboard edge device applies a VP model and other calculation models/modules to detect, identify, track, and count VP elements along the way the inspection vehicle travels in a real-time fashion. The apparatus connections and setup are shown in FIG. 3.

Figure 3:
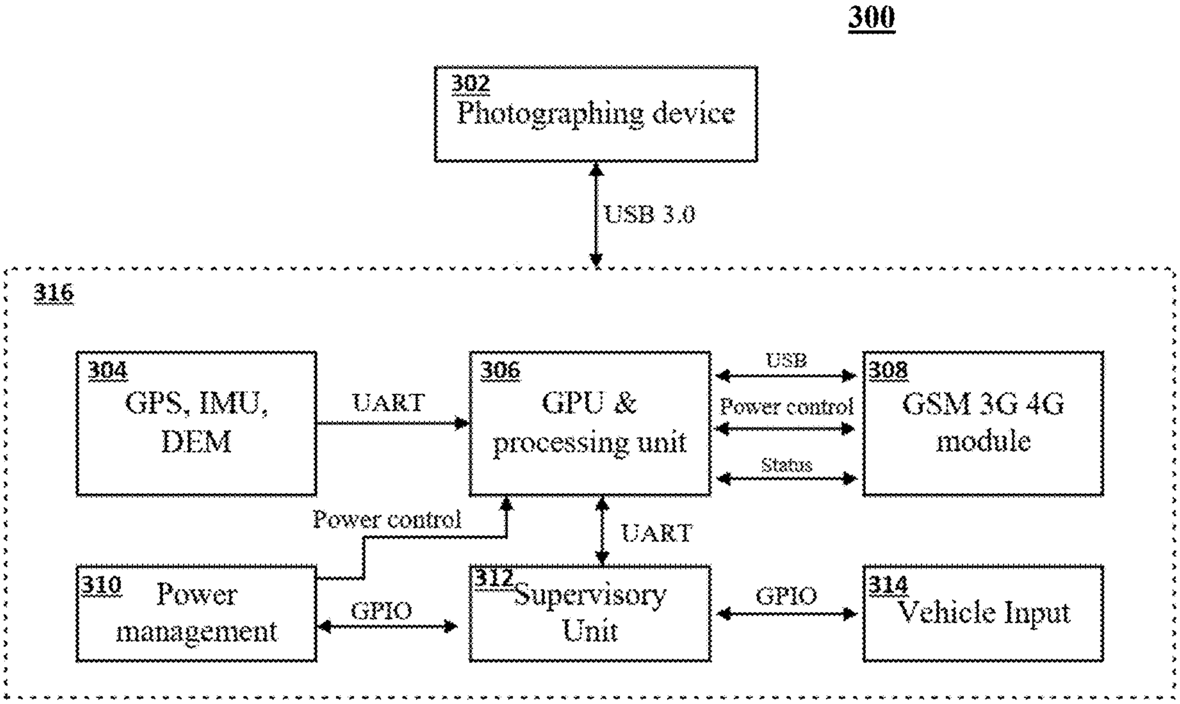
FIG. 3 schematically renders one of the conjurations and setups of apparatuses and photographing devices that are used in capturing needed images or video footages and other information which are later used in visual pollution detection.

Referring to FIG. 3, in the setup 300, the photographing device 302, in some embodiments, is communicatively connected (such as via an USB 3.0 connection) to an embedded device 316. Embedded device 316 can be an edge device that includes a GPS/IMU/DEM unit 304, a GPU and processing unit 306, a GSM ("Global System for Mobile Communications") 3G or 4G module 308, a power management unit 310, a supervisor unit 312, and a vehicle unit 314. The GPS unit 304 supplies GPS information via an UART connection ("universal asynchronous receiver-transmitter") to the GPU & processing unit 306, in which Graphics Processor(s) 290 and Processor(s) 290 co-process loaded software programs in a collaborative way, and which communicates with the supervisor unit 312 with an UART connection as well. The supervisor unit 312 communicates with the power management unit 310 and the vehicle unit 314 via GPIO connections ("general-purpose input/output") respectively, and the power management unit 310 sends power control signals and power via a conventional power supply connection to the GPU & processing unit 306, which also supply power to the GSM 3G/4G module 308 via a conventional power supply connection. 306 and 308 also exchange status information and data via an USB connection and a status reporting connection.

The GSM 3G/4G module 308 is a communication module used for connectivity with the backend server or a cloud (such as 124) that stores the captured images/video-footages along with detected/identified/tracked VP elements and augmented information about the VP elements. Supervisor unit 312 is always powered on with a direct connection to the battery (not shown) via 310. It checks if the vehicle on which the edge device 316 is mounted is "on" or "off" by getting the data from vehicle unit 314. If the vehicle is "on", 312 will turn on, via power management unit 310, the power of the other units and AI engine (not shown, but loaded in the processing unit 306) will start working. If the vehicle is "off", 312 sends signal over UART to GPU & processing unit 306 to shutdown itself. The vehicle unit 314 can be connected to ACC ("Adaptive Cruise Control") sensor of the car or to OBD-II connector (note, the connector is used to access the vehicle's computer for various tasks, such as emissions tests and diagnostics. The OBD-II port is where the Hum System is installed so that the network can communicate with the vehicle directly) to check if the vehicle is "on" or "off".

The placement of the photographing device (camera) 302 can be inside a vehicle on the windshield or on top of the vehicle but tilted slightly towards the right. The orientation of the camera towards the right helps in getting a good view of the roadside. The vehicle is referred to as the inspection vehicle because it will be patrolling the city neighborhoods for finding out various visual pollution. The inspection vehicle must be travelling on the rightmost lane of the road to avoid disturbing other vehicles and cause traffic. It also helps in getting a clear picture of the roadside scenes. Under this setting, the said moving patrol vehicle is going on the rightmost lane or the said slow lane. The described setup can be installed in any other moving vehicle like a bus or a van. The mentioned setup does not require information to be sent over the internet to a server to estimate size or location of the detected visual pollution elements. The placement and positioning of the camera is well within the scope of this disclosure. It is noted that the above setup is for a traveling condition in which the traveling direction of a vehicle must be on the right-hand side of a road. For a different traveling condition (such as vehicles traveling on the left-hand side of a road), the setup would conceivably need to be adjusted to fit the condition correspondingly.

In some embodiments, the vehicle mounted photographing device (camera) 302, with a resolution set at 1920×1080, takes in a continuous video stream at 30 fps ("frames per second") of the roadside scene. The video stream is converted to an image for every frame of the video footage (note, in some embodiments, the video stream is converted to an image for every 2, 3, 4, or 5 frame of the video footage, and a label propagation technique is applied to label the objects/elements in the intermediate frames) while the camera-carrying vehicle is patrolling the neighbourhood. The converted image is then processed on the edge device 316 to detect visual pollution elements in the scene presented in the image. It is noted that, in some embodiments, only the VP element that is nearest to the moving vehicle in the scene is processed by the model so that the segmentation, tracking, counting, and then size estimation and location calculation of the VP element is performed accurately, because if every VP element in the scene is detected, then the segmentation, tracking, and counting will not be performed accurately.

The raw video footage is passed to a model backbone (executed in the GPU & Processing Unit 306) to extract spatial features, said spatial features are then passed to a VP model (executed in the GPU & Processing Unit 306) for VP element detection, the model predicts the element location in the image based on the element's characteristics, the predicted element locals are then passed to a tracking algorithm (also executed in the GPU & Processing Unit 306), the tracking algorithm tracks element locals based on previous image frames' features which include spatial and local details.

The segmentation part is done using the features extracted from the model backbone to predict pixelwise areas of interest, the predicted areas are then passed as binary image masks into a dimension estimation network parallelly for each detected and identified element, which estimates the size thereof given the mask image reference.

Figure 4:
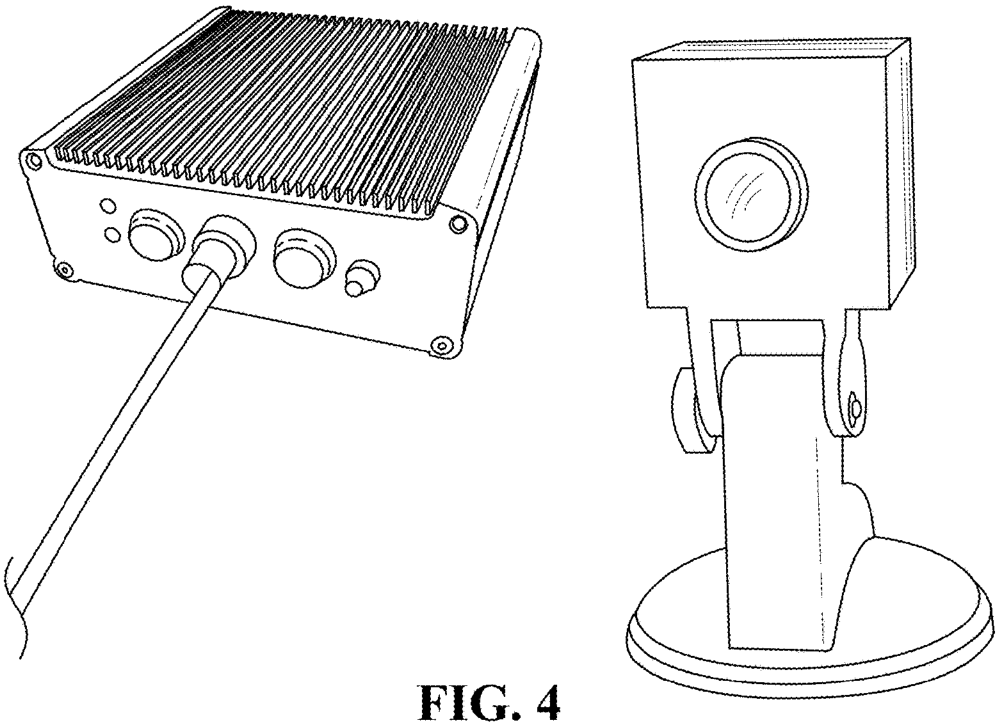
FIG. 4 are two photos of devices (an onboard edge device, and an onboard photographing device)

FIG. 4 shows a photo of an onboard edge device and an onboard photographing device that, in some embodiments, are mounted on an inspection vehicle. The vehicle can be of any make from the market. The apparatus comprises of an image/video capturing device (camera, shown in the right-hand side photo) and an edge device (shown in the left-hand side photo). The edge device is a portable computing device which is embedded with GPU and its internal modules as shown in 210 in FIG. 2. The photographing device can be a USB camera of any make which channels the video stream. The edge device with GPU can be from NVIDIA Jetson Series (Orin, Xavier, NX) or from any other manufacturers like Intel, AMD, etc. This setup is connected to the inspection vehicle's battery. The system also includes a GSM module for internet access, along with an Inertia Measurement Unit (IMU) used for accurate object localization, as shown in FIG. 3.

Figure 5:
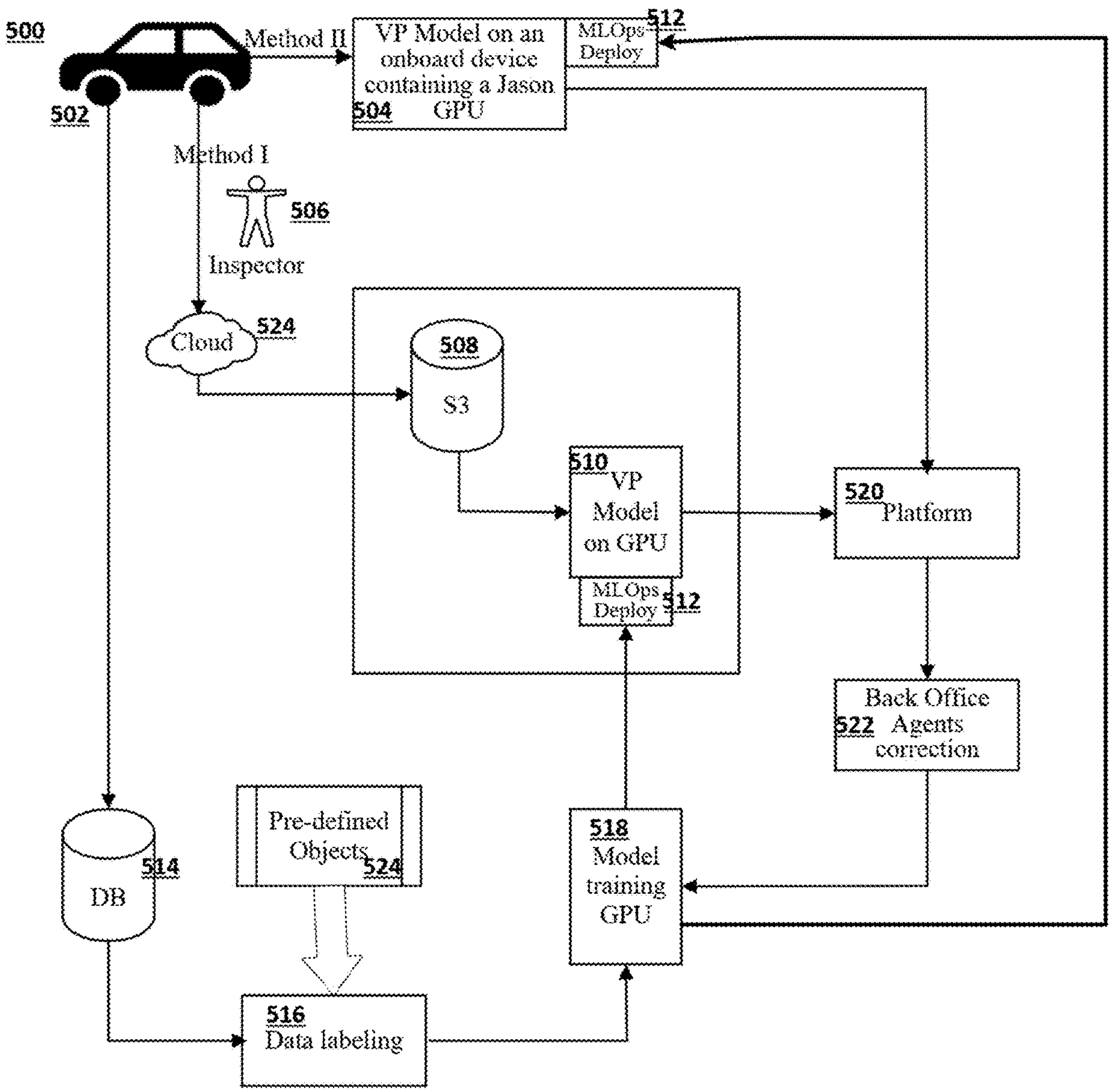
FIG. 5 illustrates a schematic diagram for the overall flow of data (training data and production data).

Referring to FIG. 5, a setup 500 of major components among which various data flow to facilitate visual pollution detection on the route a moving vehicle 502 travels. The moving vehicle (inspection vehicle) 502 first travels around a wide variety of areas in which the scene along the traveling route varies. The vehicle 502 collects testing data composed of images or video footages, with or without inspector 506's presence while traveling. In some embodiment, the presence of inspector 506 during the collection of testing data would be helpful to ensure the quality of the collected testing data (such as rooting out redundant data or erroneous/corrupted data). Regardless of the presence of inspector 506 during the collection, collected testing data is stored in the database 514 and then feed into the data labeling module 516. Data labeling can be achieved by manual work of the inspector or someone else according to a set of predefined objects 524 (such as garbage can, light pole, excavation, road damage, waste, irregular construction site, etc.). Data labeling can also be achieved by automatic work by a computer vision model, in which case the quality of the labeling has to be quality controlled by a human inspector or reviewer. It is noted that the pre-defined objects can be expanded or contracted to fit the need of circumstances. After all collected test data is properly labeled, the data with label is fed into a model training on GPU 518, for training a neural network model to learn the test data according to their labels.

After the model is trained, it is deployed, via the ML Ops Deploy 512 (Machine Learning Operations (MLOps) is a core function of Machine Learning engineering, focused on streamlining the process of taking machine learning models to production, and then maintaining and monitoring them), to either 510—a GPU located in the cloud 524, so that 510 becomes a VP model loaded on the GPU, or 504—a GPU (such as a Jason GPU) located in an on-board device (such as an edge device), so that 504 becomes a VP model located on an on-board GPU.

In the case of Method I, production data of images or video footages collected from the inspection vehicle 502 may or may not quality controlled by the inspector 506 before transmitted to the cloud 524. Cloud 524 contains, among other things, a storage S3 508 as buffer to hold data to be examined by the VP model on GPU 510. 510, exams data stored in S3, one frame a time, to detect any VP element, and track/identify detected VP elements and then augment them with estimated size/location thereof (the estimation/calculation is done by some specialized modules discussed in connection with FIGS. 2 and 3). Once all VP elements are properly detected and augmented with calculated properties (size and location) and ID, they are marked in the input data stream, and the data stream is transmitted to the Platform 520 which is a computing system on which the marked data stream is presented to human agents for manual inspection and/or reporting. The agents correct 522 any mistakes of the detected VP elements, and release the final detection reports to the party concerned (such as a city officer who is in charge of removing detected visual pollution elements). Also, the corrected detection data is fed back to the model training GPU 518 for re-training the VP model as a process of self-healing and improvement.

Similarly, if method II is adopted, raw data collected by the inspection vehicle is fed into the VP Model on an onboard GPU 504, and 504 would carry on the detection task as VP Model on GPU 510 (which is located in the cloud 524) would do. The rest of the data flow would be the same as in the method I.

It is noted that in some embodiments, a third method is adopted (not shown in FIG. 5). That is, instead of having the VP model deployed to an onboard GPU or a GPU in the cloud, the model may be deployed in a GPU on-premise (neither in the cloud nor on-board). Regardless of the location of the GPU, the VP Model carries the detection in the same way.

It is also noted that after the back-office agents correct data augmented with detected VP elements, the corrected data may be put into the database 514 before it is fed into retraining at the model training GPU 518.

Figure 6:
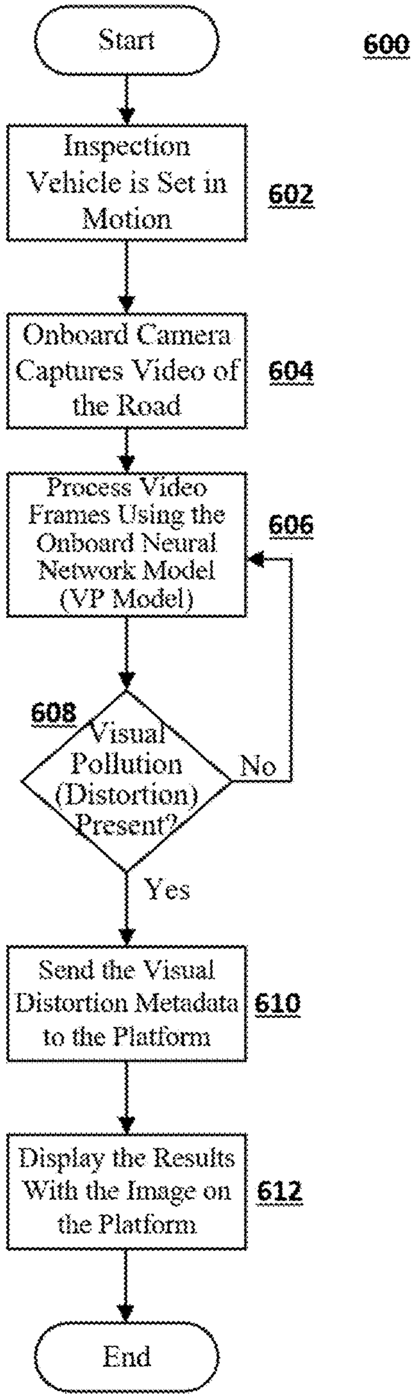
FIG. 6 illustrates a flowchart of the real-time detection of visual pollutions by using a photographing device (camera) and an edge device onboard an inspection vehicle, according to certain embodiments.

Referring to FIG. 6, it illustrates a flowchart of Method II of FIG. 5. It shows the flowchart 600 of the real-time detection of visual pollutions by using a photographing device (camera) and an edge device on-board an inspection vehicle, according to certain embodiments.

Once started, the real-time detection flow starts with setting the inspection vehicle in motion 602, wherein the on-board camera captures images or video footages of the road along the vehicle's traveling route 604. The captured images/videos are then streamed to the onboard edge device. In the edge device, a buffer stores the streamed images/videos data, and from the buffer, the GPU of the edge device runs a VP model to retrieve the images or frames of the videos and then to process video frames 606. The VP model detects whether or not there is presence of a visual pollution element (a VP distortion). If there is no VP pollution element present in the current frame under examination, then the model retrieves the next frame to exam. Otherwise, the detected VP element is undergone other processes for obtain metadata (the other processes are not shown in the process 600). The metadata includes tracking data (ID), size and location of the VP element.

Once the metadata of the VP element (a VP distortion) is obtained, the VP element along with its metadata is sent to the Platform (the computer system for storing, presenting, and further analyzing the VP element and its metadata) 610. And finally, the VP element along with its metadata is augmented to its corresponding image in the video frame, and the augmented image is displayed in the video footage on the Platform 612. The displaying can be in various ways including on-board displaying, or remote displaying in a back-office communicatively coupled with the on-board edge device, and the like.

This process continues until all frames of streamed video footages are processed, after which the process is concluded.

Figure 7:
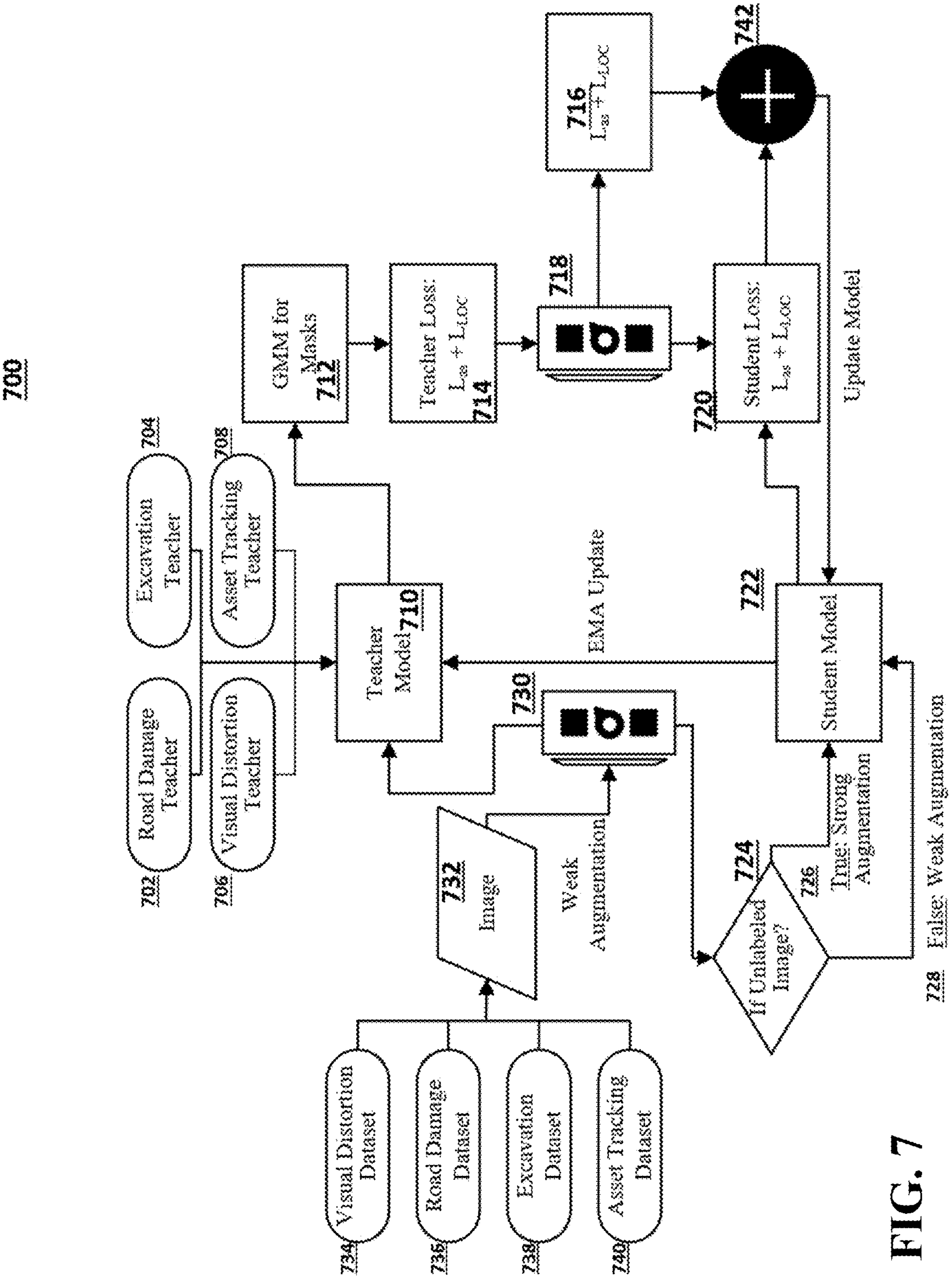
FIG. 7 illustrates a schematic chart of training a VP model via an enhanced knowledge distillation paradigm specifically tailored for visual pollution detection.

Referring to FIG. 7, it illustrates a schematic chart for training a VP model via an enhanced knowledge distillation specifically tailored for visual pollution detection.

Specifically, FIG. 7, shows a Teach-Student training paradigm aimed to teach a single student model (abbreviated as student) the classes/labels of the 4 teacher models (702, 704, 706, 708). Each teacher model (abbreviated as teacher) is specialized in one use-case and trained beforehand.

Four datasets each with classes/labels for each use-case including 734, 736, 738, 740. All of the datasets are added into a single randomly sorted data loader. The process is started by passing the current image batch in 732 through the dynamic switch at 730. The dynamic switch would either pass the image into the teacher model at 710 and the student model at 722 or pass it to the student model 722 only. The dynamic switch would pass the image into bother student and teacher if the last student loss is higher that the teacher, otherwise it will disable the teacher model by passing the image into the student model only. In the judgement call 724 a strong augmentation is applied if the image in the batch 732 contains unlabeled image data (note, a strong augmentation on image may include random scale jittering and horizontal flipping, large-scale jittering, and copy-pasting an object to the image). Otherwise, a weak augmentation is applied (note, weak data augmentation transforms the training examples with e.g. rotations or crops for images, and trains on the transformed examples in place of the original training data). After each epoch, an EMA (Exponential Moving Average (EMA) of weights) update step (the arrow pointing from 722 to 710) is conducted to the weight of the teacher model of weights (note, EMA is often used as a teacher model in semi-supervised learning and consistency training, as it offers benefits such as improved generalization, exceptional early performance, robustness to label noise, consistency in predictions), starting with small weightage, allowing the teacher model to be able to teach the student by mimicking them slightly.

After that, the process passes the image into both models 710, and 722 (depending on the switch 730) to calculate both localization and classification losses in 720, and 714 for both models. GMM (Gaussian mixture models) is applied to cluster out the mask distribution in 712 (note, a Gaussian mixture model is a probabilistic model that assumes all the data points are generated from a mixture of a finite number of Gaussian distributions with unknown parameters). Again, a dynamic switch at 718 is applied if the student loss from the last epoch was higher to add both teacher and student losses at 742 for the backpropagation and update the student model weights every epoch to 722.

All teacher models (702, 704, 706, 708) and datasets (734, 736, 738, and 740) are in dashcam setup. Such training procedure would allow semi-supervision over different datasets thus improving model performance and robustness. Also, knowledge distillation over teacher models allows student model 722 to exhibit expert level performance. Moreover, with the switching on/off function of the dynamic switches 730 and 718 (which are designed to switch on or off depending on the student model's performance), the student model 722 is kepted on learning from the teacher model 710 until the student model surpasses (i.e., becomes superior, in terms of performance) the teacher model 710 in any dataset and the currently on-going training epoch is completed. Under this customized knowledge distillation scheme, the performance of the student model is trained to reach to the expert level of all teacher models on all datasets.

Aforementioned weak data augmentation and strong data augmentation are meant to be image data augmentation, which is the process of generating new transformed versions of images from the given image dataset to increase its diversity. To a computer, images are just a 2-dimensional array of numbers. These numbers represent pixel values, which you can tweak in many ways to generate new, augmented images. These augmented images resemble those already present in the original dataset but contain further information for better generalization of the machine learning algorithm.

Types of augmentation being applied include a larger set including: Scaling, Rotation, Horizontal flip, Translation, Shearing, Color Manipulation (Brightness, Contrast, Saturation, Hue), Image Manipulation (Bluring, Sharpening, Random Cropping, Cutout, Mosaic, Mixup, Copy and Paste, Zoom In and Out). The augmentation options allow a model trained on the augmented images to operate robustly in unforeseeable locations with unexpected scenarios, and the widely varied augmentations can be loosely categorized into two categories: weak augmentation, and strong augmentation.

Weak Augmentation: Data augmentation refers to image augmentation done to training for improving robustness of model performance. Weak Augmentation refers to low potency of augmentation with low probability of occurring. It includes slight blurring, slight color modification, slight image rotation, horizontal flip, and many other small modifications to the data to during training to improve performance.

Strong Augmentation: High potency of augmentation with high probability of occurrence, including Cutouts, Mosaic, RGB shift, and many other options that alters the image drastically.

Again, weak Augmentation is applied for the Teacher (Expert model) to inference the image, while using the Strong Augmentation for the student model only if the image had no prior label (Unlabeled Images).

730 and 718 are dynamic switches that can either run both teacher and student or selectively run the student model.

714 and 720 refers to the teacher and student model losses respectively, which includes $L_{CLS}$ and $L_{LOC}$ referring to both the classification and localization losses respectively, the classification loss is the classical cross entropy, while the localization loss involves two losses category including bounding boxes and segmentation loss. The bounding boxes loss has two parts (DPL (Distribution Focused Loss) and CIOU (Complete Intersection over Union)) the segmentation loss is binary cross entropy of the pixelwise class prediction. All losses are summed.

718 has a dynamic switch in which we select between the teacher loss or zero, which is then added to student model in 718 summations, the dynamic switches to zero only if the student outperformed the teacher model, which is then added to the student loss.

Exponential Moving Average or EMA is a technique used during training to smooth the noise in the training process and improve the generalization of the model. It is an effective technique that can be used with any model and optimizer. Here's a recap how EMA works:

At the start of training, the model parameters are copied to the EMA parameters.

At each gradient update step, the EMA parameters are updated using the following formula:

$$\text{ema\_param} = \text{ema\_param} * \text{decay} + param * (1 - \text{decay})$$

On start of validation epoch, the model parameters are replaced by the EMA parameters and reverted back on the end of validation epoch.

At the end of training, the model parameters are replaced by the EMA parameters.

Gaussian Mixture Model (GMM) is a probabilistic model for representing normally distributed subpopulations within an overall population. It is usually used for unsupervised learning to learn the subpopulations and the subpopulation assignment automatically. It is also used for supervised learning or classification to learn the boundary of subpopulations. In all embodiments, the GMM is used without major modifications except fine-tuning thereof for various use cases.

To sum up the a Teach-Student training paradigm applied in some embodiments, the paradigm, unlike conventional knowledge distillation systems in which multiple models are incrementally added and maintained, and each model is with different use-case either as mixture of experts or separate ones, merges all teacher models into one efficient student model, so that it saves in special, computational, and DevOps resource while enabling use-cases on edge devices. When it comes to utilizing unlabeled data, the conventional systems train over unlabeled data to further improve model performance for each introduced use-case separately or relabel the whole dataset again for each newly introduced use-case, while the paradigm trains over all unlabeled dataset for all use-cases, so that it further improves the model performance by using all unlabeled use-case datasets while reducing the extra resource needed to train each model separately. With regard to knowledge distillation, the conventional systems train a smaller student model to perform like a larger teacher model for efficiency, while the paradigm trains a general student model to perform like multiple teacher models for efficiency, so that one student model would have the classes of all teacher models with minimum performance loss.

Figure 8:
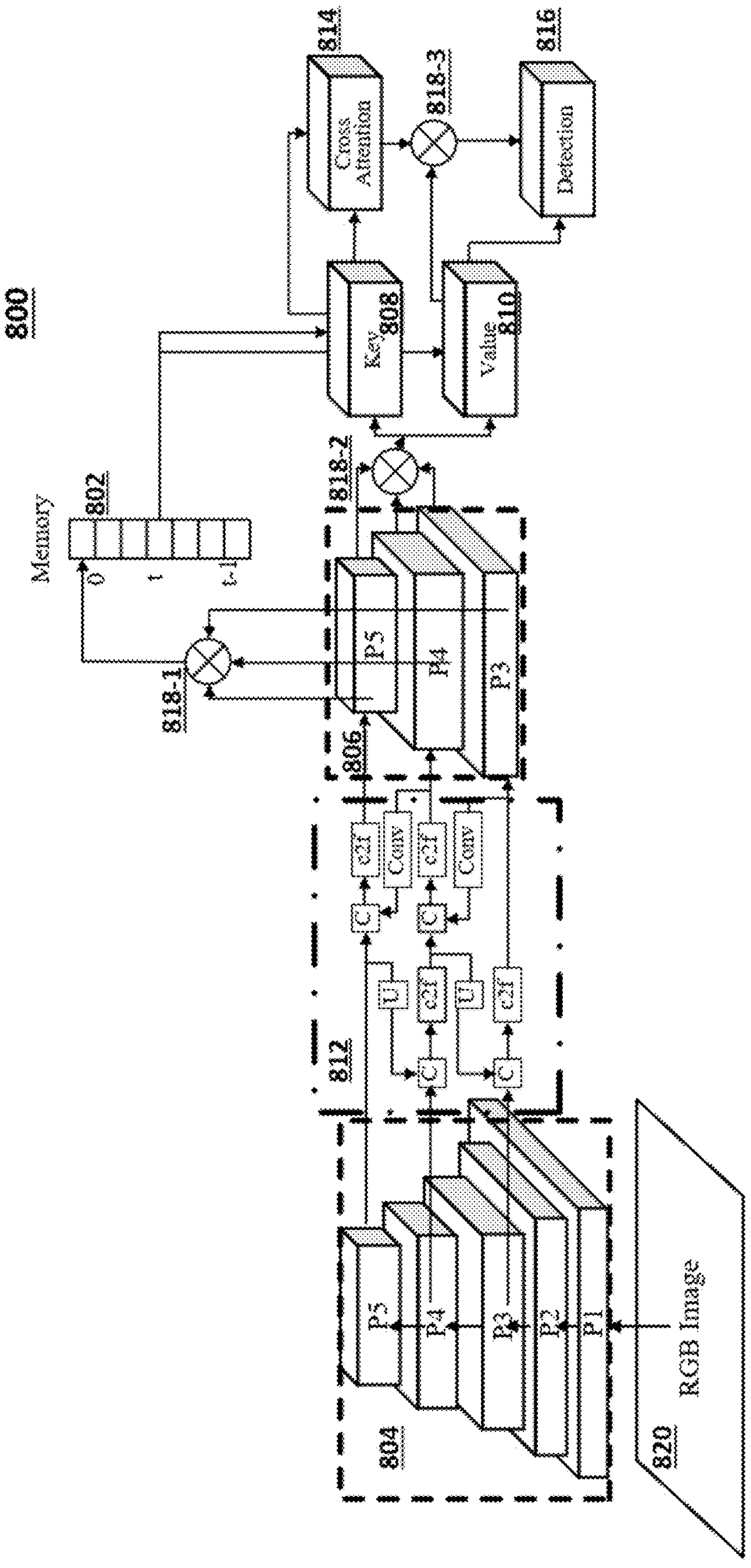
FIG. 8 illustrates a schematic diagram of the VP model which has a built-in memory to improve the tracking and detection performance.

Referring to FIG. 8, it shows the VP model utilizing the Video Instant Segmentation paradigm 800 in which a memory 802 is employed to improve the tracking and detection performance.

After going through two batches of feature extraction and classification (804 and 806, between which, some convergency and coarse-to-fine conversion need to happen), the result of classification/detection is put in both the memory 802 and a key-value hash table 808 for uniquely detecting a visual pollution element.

In FIG. 8, backbone 804 (a CNN model) takes an image 820 and process it to a multiple level of features (P1, P2, P3, P4, and P5) (each of which is more abstract that the previous level), and the multi-level features form a feature pyramid. Model neck 812 is used to compress the features of 804 to make it smaller for fitting into an edge device, and its outcome is 806, wherein a minimized model is smaller and powerful enough for detection, in which only necessary features such as P3, P4, and P5 are preserved. The purpose of model neck is to remove object size bias. In some embodiments, a new efficient model neck that runs fast for edge devices is used.

Merger 818-1 and 818-2 is applied once and is used to merge the different size features P3, P4 and P5 into a merged feature and store it to memory 802, the merged feature goes into Key (808)/Value (810) hash. At the same time, memory 802 insert indexing information from the previous n frames to the hash as well.

The hash (808+810) works together with Cross Attention 814 and merger 818-3 to efficiently track detected objects across multiple frames of a video footages. This framework is based on Prototypical Cross Attention Network (PCAN). PCAN first distills the space-time memory into a set of frame-level and instance-level prototypes, followed by cross-attention to retrieve rich information from the past frames. In contrast to most previous MOTS (Multiple objects tracking and segmentation) methods with limited temporal consideration, PCAN efficiently performs long-term temporal propagation and aggregation, and achieves large performance gain on the two largest MOTS benchmarks with low computation and memory cost.

FIGS. 9-11 shows a few frames of video footages, in which identified VP elements are augmented with their respective metadata (i.e., ID, location, size). Human inspectors could accordingly act upon those augmented visual confirmation of the shown VP elements.

Additional Embodiment Details

The present invention may be a system, a method, and/or a computer program product. The computer program product and the system may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device or a computer cloud via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Java, Python or the like, and conventional procedural programming languages, such as the "C" programming language or similar programming languages, and scripting programming languages, such as Perl, JavaScript, or the like. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In all embodiments, a production environment is employed to deply and run a computing system. A production environment generally is an edge-device mounted on a moving vehicle, an on-premise computing system communicatively connected to the moving vehicle, or a remote cloud system communicatively connected to the moving vehicle. A production environment is different from a training environment in that the production environment feeds the computing system with a real-world input data, whereas a training environment usually feeds a computing system with a pre-organized input data to train the computing system. A production environment is different from a testing environment in that the testing environment feeds the computing system with testing input data which may not be a live production data. Sometimes, a production environment, a training environment, and a testing environment can overlap if they are crafted in a way not to interfere or burden the various production runnings in the production environment.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Certain embodiments of this invention are described herein, including the best mode known to the inventors for carrying out the invention. It should be understood that the illustrated embodiments are exemplary only, and should not be taken as limiting the scope of the invention.

Benefits, other advantages, and solutions to problems have been described herein with regard to specific embodiments. However, the benefits, advantages, solutions to problems, and element(s) that may cause benefit, advantage, or solution to occur or become more pronounced are not to be construed as critical, required, or essential features or elements of the claims. Reference to an element in the singular is not intended to mean "one and only one" unless explicitly so stated, but rather "one or more." As used herein, the terms "comprises", "comprise", "comprising", or a variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for practice unless expressly described as "essential" or "critical". Moreover, those skilled in the art will recognize that changes and modifications may be made to the exemplary embodiments without departing from the scope of the present invention. Thus, different embodiments may include different combinations, arrangements and/or orders of elements or processing steps described herein, or as shown in the drawing figures. For example, the various components, elements or process steps may be configured in alternate ways depending upon the particular application or in consideration of cost. These and other changes or modifications are intended to be included within the scope of the present invention, as set forth in the following claims.

What is claimed is:

1. A computer-implemented method for real-timely detecting visual pollution (VP), comprising:

training a plurality of expert models based on a plurality of test sets of images or video footages and a plurality of pre-determined objects to detect the plurality of pre-determined objects among the plurality of test sets of images or video footage, and to produce a VP model, wherein the training is a procedure that automates machine learning workflows by processing and integrating the plurality of test sets of images or video footages into the VP model in terms of detecting the plurality of pre-determined objects from the plurality of test sets of images or video footages, and the training comprises designating one of the plurality of expert models as a student model, designating the rest of the plurality of expert models as teacher models, conducting a plurality of knowledge distillation iterations on the plurality of test sets of images or video footages and the plurality of pre-determined objects, outputting the student model as the VP model;

deploying the VP model into a production environment to receive a production set of images or video footage, running the VP model through the production set of images or video footages, quality-assuring the VP model to produce feedback including a set of false-positives and false-negatives, re-training the VP model based on a plurality of test sets of images or video footages and a plurality of pre-determined objects by factoring the feedback, and re-deploying the VP model into the production environment, wherein the production environment is an edge-device mounted on the moving vehicle, an on-premise computing system communicatively connected to the moving vehicle, or a remote cloud system communicatively connected to the moving vehicle;

capturing and storing a set of images or video footages by using a photographing device mounted on the moving vehicle;

detecting, by using the VP model, a set of visual pollution elements from the set of images or video footages;

estimating, for each element of the set of visual pollution elements, a size of the visual pollution element based on an unsupervised camera depth estimation model;

calculating, for each visual pollution element of the set of visual pollution elements, an absolute position of the visual pollution element based on a geographical location and a plurality of movement properties of the moving vehicle, wherein the plurality of movement properties of the moving vehicle include movement speed, movement direction, and movement acceleration rate of the moving vehicle;

tracking, logging, and counting the set of visual pollution elements along with their respective estimated size and absolute position; and reporting, and displaying the set of visual pollution elements along with their respective estimated size and absolute position.

2. The computer-implemented method of claim 1, further comprises integrating a newly acquired set of images or video footages into the plurality of sets of images or video footages, and re-training the plurality of expert models to produce the VP model based on the plurality of sets of images or video footages, and the plurality of pre-determined objects.

3. The computer-implemented method of claim 1, further comprises integrating a newly acquired set of pre-determined objects into the plurality of pre-determined objects, and re-training the plurality of expert models to produce the VP model based on the plurality of sets of images or video footages, and the plurality of pre-determined objects.

4. The computer-implemented method of claim 1, further comprises integrating a newly acquired set of images or video footages into the plurality of sets of images or video footages, integrating a newly acquired set of pre-determined objects into the plurality of pre-determined objects, and re-training the plurality of expert models to produce the VP model based on the plurality of sets of images or video footages, and the plurality of pre-determined objects.

5. The computer-implemented method of claim 1, wherein the plurality of knowledge distillation iterations on the plurality of sets of images or video footages is free from human intervention and allows self-healing and continuous learning improvement with batch training over a set of newly acquired images, the number of the plurality of knowledge distillation iterations either is pre-determined or the plurality knowledge distillation iterations go on until a pre-determined training threshold is reached, and each iteration of the plurality of knowledge distillation iterations comprises:

loading and training the teacher models against the plurality of sets of images or video footages and, in the case of the set newly acquired images being available, the set of newly acquired images, extracting, for each teacher model, an output, a model confidence, classification lose, and localization lose over a set of augmented images from the each of the teacher models, wherein the set of augmented images are the images being augmented, with or without a label, among the plurality of sets of images or video footages, and, in the case of the set newly acquired images being available, the set of newly acquired images;

loading and training the student model against the set of augmented images, extracting an output, a classification lose, and a localization lose, from the student model over the set of augmented images;

comparing, for each of the teacher models, the output, the classification lose, and the localization lose extracted from the student model, with the output, classification lose, and localization lose extracted from the teacher model;

passing, for each of the teacher models, the classification lose and localization lose extracted from the student model alone to a model optimizer in the case of that the student model has better performance than the teacher model;

passing, for each of the teacher models, the classification lose and localization lose extracted from the student model along with the classification lose and localization lose extracted from the teacher model to a model optimizer in the case of that the teacher model has better performance than the student model;

updating, for each of the teacher models, by the model optimizer, a set of parameters of the student model, allowing the student to learn from the teacher model;

updating, for each of the teacher models, via an Exponential Moving Average approach, the teacher model's output layer to the student model, starting with a small weightage to allow the student model mimicking the teacher model in a small increment.

6. The computer-implemented method of claim 1, wherein the calculating, for each element of the first set of visual pollution elements, an absolute position based on the geographical location and the plurality of movement properties of the moving vehicle, comprises:

estimating, for each element of the set of visual pollution elements, a relative position of the element in relation to the photographing device by using a global positioning system (GPS), an Inertial Measurement Unit (IMU), and a depth estimation; and calculating, for each element of the first set of visual pollution elements, the absolute position of the element by augmenting the relative position of the element with a position of the photographing device at the time the set of captured still images were captured.

7. The computer-implemented method of claim 1, wherein the detecting, by using the VP model, a set of visual pollution elements from the set of images or video footages further comprising using a hash table and a memory to uniquely detect the set of visual pollution elements across multiple frames of the set of images or video footages.

8. The computer-implemented method of claim 3, wherein before re-training the plurality of expert models to produce the VP model based on the plurality of sets of images or video footages, relabelling images, or video footages in the plurality of sets of images or video footages when the newly acquired set of pre-determined objects is integrated into the plurality of pre-determined objects.

9. The computer-implemented method of claim 1, wherein the training a plurality of expert models based on a plurality of test sets of images or video footages and a plurality of pre-determined objects to recognize the plurality of pre-determined objects among the data in the plurality of sets of test images or video footage comprising applying pixel level segmentation in detecting a first set of objects in the plurality of pre-determined objects, and applying bounding boxes technique in detecting a second set of objects in the plurality of pre-determined objects.

10. The computer-implemented method of claim 1, wherein the tracking, logging, and counting the set of visual pollution elements along with their respective estimated size and absolute position comprising assigning an ID for each VP element of the set of visual pollution elements, and using a video object segmentation technique, a short-term memory and a long-term memory to keep track of the each VP element across all the frames of the set of images or video footages.

11. A system, comprising:

a computing device, one or more photographing devices, a production environment, wherein the production environment is an edge-device mounted on a moving vehicle, an on-premise computing system communicatively connected to the moving vehicle, or a remote cloud system communicatively connected to the moving vehicle, wherein the computing device comprises a GPU, a processor, one or more computer-readable memories and one or more computer-readable, tangible storage devices, one or more input devices, one or more output devices, and one or more communication devices, and wherein the one or more photographing devices are connected to the computing device and are mounted in the moving vehicle for feeding one or more captured video streams of street scenes to the computing device's video buffer, wherein the computing device to perform operations comprising:

training a plurality of expert models based on a plurality of test sets of images or video footages and a plurality of pre-determined objects to detect the plurality of pre-determined objects among the plurality of test sets of images or video footage, and to produce a VP model, wherein the training is a procedure that automates machine learning workflows by processing and integrating the plurality of test sets of images or video footages into the VP model in terms of detecting the plurality of pre-determined objects from the plurality of test sets of images or video footages, and the training comprises designating one of the plurality of expert models as a student model, designating the rest of the plurality of expert models as teacher models, conducting a plurality of knowledge distillation iterations on the plurality of test sets of images or video footages and the plurality of pre-determined objects, outputting the student model as the VP model;

deploying the VP model into a production environment, to receive a production set of images or video footage, running the VP model through the production set of images or video footages, quality-assuring the VP model to produce feedback including a set of false-positives and false-negatives, re-training the VP model based on a plurality of test sets of images or video footages and a plurality of pre-determined objects by factoring the feedback, and re-deploying the VP model into the production environment;

capturing and storing a set of images or video footages by using the one or more photographing devices;

detecting, by using the VP model, a set of visual pollution elements from the set of images or video footages;

estimating, for each element of the set of visual pollution elements, a size of the visual pollution element based on an unsupervised camera depth estimation model;

calculating, for each visual pollution element of the set of visual pollution elements, an absolute position of the visual pollution element based on a geographical location and a plurality of movement properties of the moving vehicle, wherein the plurality of movement properties of the moving vehicle include movement speed, movement direction, and movement acceleration rate of the moving vehicle;

tracking, logging, and counting the set of visual pollution elements along with their respective estimated size and absolute position; and reporting, and displaying the set of visual pollution elements along with their respective estimated size and absolute position.

12. The system of claim 11, wherein the computing device to perform operations further comprising integrating a newly acquired set of images or video footages into the plurality of sets of images or video footages, and re-training the plurality of expert models to produce the VP model based on the plurality of sets of images or video footages, and the plurality of pre-determined objects.

13. The system of claim 11, wherein the computing device to perform operations further comprising integrating a newly acquired set of pre-determined objects into the plurality of pre-determined objects, and re-training the plurality of expert models to produce the VP model based on the plurality of sets of images or video footages, and the plurality of pre-determined objects.

14. The system of claim 11, wherein the computing device to perform operations further comprising integrating a newly acquired set of images or video footages into the plurality of sets of images or video footages, integrating a newly acquired set of pre-determined objects into the plurality of pre-determined objects, and re-training the plurality of expert models to produce the VP model based on the plurality of sets of images or video footages, and the plurality of pre-determined objects.

15. The system of claim 11, wherein the plurality of knowledge distillation iterations on the plurality of sets of images or video footages is free from human intervention and allows self-healing and continuous learning improvement with batch training over a set of newly acquired images, the number of the plurality of knowledge distillation iterations either is pre-determined or the plurality knowledge distillation iterations go on until a pre-determined training threshold is reached, and each iteration of the plurality of knowledge distillation iterations comprises:

loading and training the teacher models against the plurality of sets of images or video footages and, in the case of the set newly acquired images being available, the set of newly acquired images, extracting, for each teacher model, an output, a model confidence, classification lose, and localization lose over a set of augmented images from the each of the teacher models, wherein the set of augmented images are the images being augmented, with or without a label, among the plurality of sets of images or video footages, and, in the case of the set newly acquired images being available, the set of newly acquired images;

loading and training the student model against the set of augmented images, extracting an output, a classification lose, and a localization lose, from the student model over the set of augmented images;

comparing, for each of the teacher models, the output, the classification lose, and the localization lose extracted from the student model, with the output, classification lose, and localization lose extracted from the teacher model;

passing, for each of the teacher models, the classification lose and localization lose extracted from the student model alone to a model optimizer in the case of that the student model has better performance than the teacher model;

passing, for each of the teacher models, the classification lose and localization lose extracted from the student model along with the classification lose and localization lose extracted from the teacher model to a model optimizer in the case of that the teacher model has better performance than the student model;

updating, for each of the teacher models, by the model optimizer, a set of parameters of the student model, allowing the student to learn from the teacher model;

updating, for each of the teacher models, via an Exponential Moving Average approach, the teacher model's output layer to the student model, starting with a small weightage to allow the student model mimicking the teacher model in a small increment.

16. The system of claim 11, wherein the calculating, for each element of the first set of visual pollution elements, an absolute position based on the geographical location and the plurality of movement properties of the moving vehicle, comprises:

estimating, for each element of the set of visual pollution elements, a relative position of the element in relation to the photographing device by using a global positioning system (GPS), an Inertial Measurement Unit (IMU), and a depth estimation; and calculating, for each element of the first set of visual pollution elements, the absolute position of the element by augmenting the relative position of the element with a position of the photographing device at the time the set of captured still images were captured.

17. The system of claim 11, wherein the detecting, by using the VP model, a set of visual pollution elements from the set of images or video footages further comprising using a hash table and a memory to uniquely detect the set of visual pollution elements across multiple frames of the set of images or video footages.

18. The system of claim 13, wherein before re-training the plurality of expert models to produce the VP model based on the plurality of sets of images or video footages, relabelling images, or video footages in the plurality of sets of images or video footages when the newly acquired set of pre-determined objects is integrated into the plurality of pre-determined objects.

19. The system of claim 11, wherein the training a plurality of expert models based on a plurality of test sets of images or video footages and a plurality of pre-determined objects to recognize the plurality of pre-determined objects among the data in the plurality of sets of test images or video footage comprising applying pixel level segmentation in detecting a first set of objects in the plurality of pre-determined objects, and applying bounding boxes technique in detecting a second set of objects in the plurality of pre-determined objects.

20. The system of claim 11, wherein the tracking, logging, and counting the set of visual pollution elements along with their respective estimated size and absolute position comprising assigning an ID for each VP element of the set of visual pollution elements, and using a video object segmentation technique, a short-term memory and a long-term memory to keep track of the each VP element across all the frames of the set of images or video footages.

* * * * *